March 27, 1945.    R. WHITAKER ET AL    2,372,239
MANUFACTURE OF EVAPORATED MILK
Filed March 3, 1941
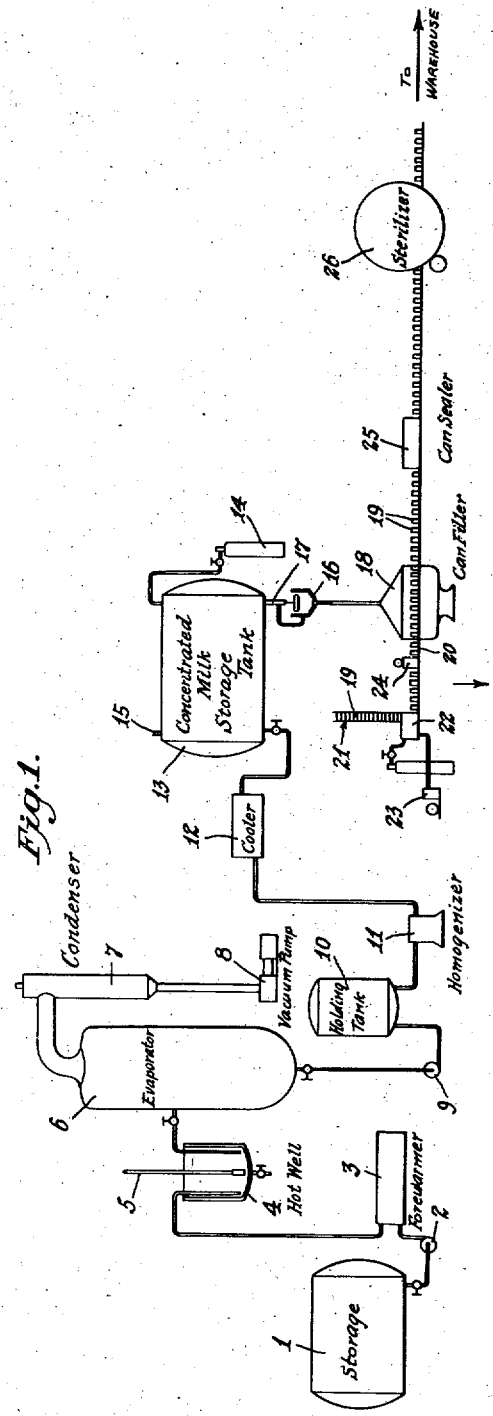
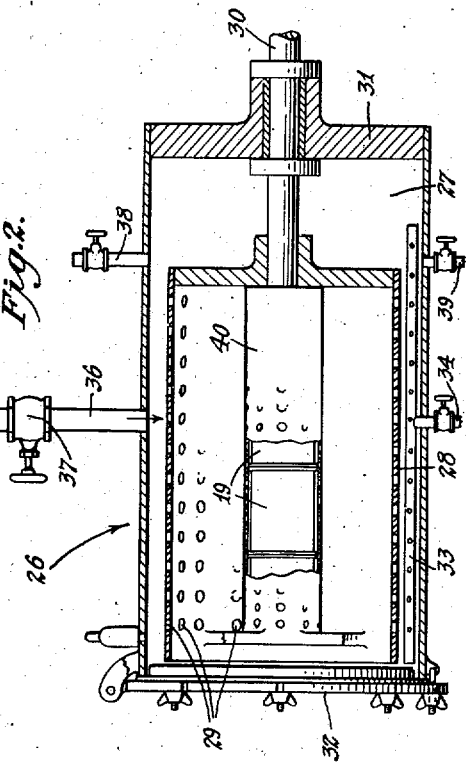
Randall Whitaker INVENTORS
Robert P. Myers and
Robert E. Homberger
BY
ATTORNEYS Patented Mar. 27, 1945

2,372,239

UNITED STATES PATENT OFFICE 2,372,239

MANUFACTURE OF EVAPORATED MILK

Randall Whitaker, Robert P. Myers, and Robert E. Homberger, Baltimore, Md., assignors to Sealtest, Inc., Baltimore, Md., a corporation of Maryland Application March 3, 1941, Serial No. 381,552

2 Claims. (Cl. 99—214)

This invention relates to improvements in the preparation of evaporated milk and relates more particularly to methods of concentrating, packaging and sterilizing evaporated milk in order to improve its appearance, physical characteristics and flavor.

Evaporated milk, as now produced commercially, has a number of undesirable characteristics which render it non-competitive with fresh or pasteurized milk in many fields. It has been recognized that the present types of evaporated milk have an undesirable flavor, variously described as "cooked" or "caramelized." Moreover, such evaporated milk has a dark color which distinguishes it from fresh or pasteurized milk and which is objectionable to many people. Also, commercially available evaporated milks cannot be coagulated with rennet like fresh or pasteurized milk and, therefore, cannot be used in the preparation of such desserts as "junket" and the like. In addition, it has been recognized that, in the preparation of evaporated milk, it has been impossible to prevent a discoloration of the inner surface of the can in which the milk is packaged and that this darkening of the color of the can likewise is undesirable. All of these objectionable features of the commercially available evaporated milks have an adverse effect upon the sale of such milk and the public acceptance of the milk as a competitor with fresh milk.

In general, the commercial processes involve the forewarming of the fresh milk to a temperature above 200° F. in order to stabilize the milk. It is then concentrated to the desired total solids content, treated with salts such as sodium citrate or di-sodium phosphate to adjust the salt balance and regulate the viscosity of the milk. The concentrated milk is then filled into suitable containers and sterilized. Usually, the milk is sterilized by heating to between about 240° F. to 245° F. for a period of between about 12 and 18 minutes although the sterilization may take place in a series of steps at different temperatures with various periods of times being required for heating in each step.

We have found that the prolonged heating at 240° F. to 245° F. usually employed has the undesirable effect of coagulating the protein of the milk to a relatively great extent and of modifying the milk in such a way that a curd is not formed when the evaporated milk is treated with rennet.

An object of the invention, therefore, is to modify the sterilizing treatment in such a way that the sterilized evaporated milk produced in accordance with our invention can be coagulated with rennet.

It is well known, of course, that the "cooked" or "caramelized" flavor of evaporated milk results from the sterilization of the milk. Although this flavor is undesirable it has not been possible, with prior methods, to sterilize the milk without the milk acquiring the "cooked" or "caramelized" flavor.

We have found that it is possible to sterilize evaporated milk without imparting the "cooked" or "caramelized" flavor to the milk and, therefore, another object of the invention is to provide evaporated milk in which the cooked or caramelized flavor is minimized or entirely eliminated.

Prior methods of sterilizing evaporated milk also cause the milk to turn dark apparently for the reason that caramelization is accomplished by a darkening of components of the milk.

We have found that discoloration of the milk can be avoided during sterilization and, therefore, another object of the invention is to provide sterilized evaporated milk which has a color similar to fresh milk and cream.

It has been observed that the tin linings of containers for evaporated milk always are discolored. It appears that the discoloration is due to a reaction between the metallic surfaces of the container wall and certain compounds formed in the milk by the prolonged heating during sterilization.

We have found that it is possible to sterilize the milk without the above mentioned reaction between the metallic walls of the container and compounds present in the heated milk by greatly reducing the time that the milk is held at temperatures where these reactions take place.

Another object of our invention, therefore, is to provide a method of sterilizing evaporated milk which will minimize or entirely eliminate the discoloration of the containers in which the evaporated milk is packaged.

Other objects of the invention will become apparent from the description hereinafter of a typical method embodying the present invention.

In accordance with the present invention, the evaporated milk product is prepared by a closely related series of steps which include, in general, the forewarming of the milk at a comparatively low temperature (below 200° F.) preparatory to concentrating the milk so that the amount of protein which is coagulated is decreased. Under these conditions high viscosity will be obtained when the concentrated milk is subsequently subjected to the sterilization treatment.

The use of a lower forewarming temperature permits the sterilization of the milk, after concentrating, to be carried out under conditions of time and temperature which could not be used without seriously impairing the viscosity and other desirable properties of the product.

In accordance with our process, the milk is subjected to a sterilization treatment in which the milk is raised in a very short period of time to a high sterilizing temperature and then quickly cooled without holding at the sterilizing temperature. It has been found that it is possible to destroy resistant bacterial spores that may be present in the milk by subjecting them momentarily to very high temperature, that is, temperatures in the range of 260° to 275° F. by bringing the containers of milk into contact with a medium having a temperature between about 280° and 300° F., which is well above the highest temperature reached in the center of the container. The more rapidly the temperature is raised to this critical sterilizing range and the faster the cooling, the less the flavor of the milk changes. In order to accomplish this rapid heating the contents of the container must be agitated vigorously in such a manner that maximum heat transfer takes place.

Although various methods of agitating the cans may be employed, the rotation of the can in a horizontal position about its longitudinal axis has been found to be the most effective. This is not only the most practical and economical means from the standpoint of the mechanical handling of the containers, but it is also advantageous because the centrifugal force developed by the whirling container causes intimate contact between the milk and the inner surface of the container and eliminates bubbles or foam which seriously interfere with heat transfer.

The seam on the inner surface of metal cans aids in agitation of the milk when the cans are rotated about their longitudinal axes. Furthermore, the head space which exists in the form of a gas bubble when the cans are in a horizontal position aids in the agitation of the contents. In carrying out this operation, the milk in contact with the wall of the container at any instant is momentarily at a temperature near that of the heating medium, and at this temperature bacterial spores are instantly killed.

Milk processed by the method of sterilization described above possesses several characteristics which distinguish it from milk processed by conventional methods of sterilization, in which the milk is heated at lower temperatures but for longer periods of time.

One of the chief characteristics of evaporated milk sterilized according to this invention is the flavor. Because of the rapidity of heating there is little, if any, of the caramelization which imparts the typical "cooked" milk flavor and the dark color to the products now on the market.

When the sterilizing conditions are such that caramelization occurs in evaporated milk certain compounds are formed which act as antioxidants preventing oxidation of susceptible constituents in the product during prolonged storage. At the same time, reactions occur which bring about the combination of oxygen with constituents of the milk, thereby rendering the product essentially free from oxygen.

In the case of sterilization, in accordance with this invention, the reaction involving the formation of antioxidants and the removal of oxygen does not take place and there develops in this product on prolonged storage a flavor best described as oxidized. Therefore, in accordance with the present invention it is highly desirable to remove substantially all of the oxygen from the container and the milk before sterilization. This may be accomplished by protecting the evaporated milk from contact with air after it is drawn from the vacuum pan, at which time it is oxygen-free. Protection is afforded the evaporated milk by the use of closed types of equipment which do not permit entry of air, or by excluding the air by maintaining an atmosphere of inert gas in the equipment. Dairy products or water used for standardization of the evaporated milk are de-aerated to remove all oxygen.

As a further protective measure the milk is protected from reincorporation of oxygen from air during the canning operation. This may be accomplished in any one of several ways or a combination of the several ways, for example, the air in the empty can being conveyed to the filler may be exhausted by a vacuum and replaced by an inert gas; the filled cans may be evacuated and the head space filled with an inert or oxygen-free gas; or the product may be packed and sealed in the container under a vacuum.

Any oxygen in the sealed can containing the product may be removed by introducing a suitable quantity of metallic calcium in the form of a powder or fine filings, immediately prior to sealing the can, which effectively removes any oxygen due to the formation of nascent hydrogen.

For better understanding of the present invention reference can be had to the accompanying drawing in which:

Fig. 1 is a diagrammatic showing of a typical form of apparatus for preparing evaporated milk in accordance with the present invention; and Fig. 2 is a view in longitudinal section of a device for sterilizing the evaporated milk.

As shown in Fig. 1 of the drawing, a typical form of apparatus for preparing evaporated milk in accordance with the present invention may consist of a milk storage tank 1 from which milk is delivered by pump 2 to a tube type of forewarming device 3. The warmed milk then passes into the hot well 4 where the temperature is raised still further by means of a steam injector 5 and held for a short time, not exceeding about 15 minutes. The forewarming treatment is an important factor in controlling the viscosity that is developed in the evaporated milk by the sterilizing process and therefore, is indirectly an important factor in preventing fat separation in the sterilized product. At the end of this time the milk is withdrawn into the vacuum pan 6 while a vacuum is maintained in the latter and where the milk is evaporated. A vacuum is maintained on the vacuum pan 6 by means of the vacuum pump 8 thereby evaporating the liquid from the milk and removing oxygen therefrom. The condenser 7 condenses the vapor removed from the vacuum pan.

The evaporated milk is then withdrawn from the vacuum pan 6 by means of a pump 9 and delivered to a holding tank 10 from which the milk is delivered to a homogenizer 11. The function of the tank 10 is to equalize the flow of the condensed milk to the homogenizer.

The milk then flows from the homogenizer 11 to a cooler 12, preferably of the plate or internal tube type, in which the milk is cooled. The milk passes from the cooler 12 to a condensed milk storage tank in which an atmosphere of inert gas is maintained, such gas being supplied from a cylinder 14 and the pressure in the storage tank being equalized by an escape valve 15. If desired, the milk can be standardized at this stage by adding oxygen-free milk products or water.

The milk is delivered from the storage tank 13 to a can filler supply tank 16 in which a constant level of milk is maintained by means of a float valve 17. The milk flows from the supply tank 16 to a can filler 18 beneath which cans 19 are delivered by means of a suitable conveyor 20 from a can supply conveyor 21. Before passing to the can filler 18 the cans are deaerated by passing them through a vacuum chamber 22 in which a vacuum is maintained by means of the vacuum pump 23 and then the cans are filled with inert gas. Moreover, before being filled with milk, the cans 19, which may be of the conventional vent hole type, may be supplied with metallic calcium at a stage 24 which removes any residual oxygen from the milk and container or an antioxidant may be supplied to the milk.

After the cans 19 have been filled at the can filler they pass to a sealing device 25 where the can is sealed and then may be suitably tested for leaks. As an additional precaution, the cans, immediately before sealing, may be subjected to a vacuum and inert gas injected into the head space of the cans. The above described elements of the device may be of any desired type and are, in practice, conventional elements readily available on the market and well known in the art.

After the cans 19 are tested, they are passed to a sterilizer 26. Fig. 2 illustrates a form of autoclave or pressure chamber which may be employed. The autoclave consists of an autoclave or pressure chamber 27 in which is rotatably mounted a reel 28 having a multiplicity of perforations 29 therein. The reel may be suitably supported upon a shaft 30 which passes through the end wall 31 of the autoclave and is driven by a motor, not shown. The autoclave 27 has a door 32 thereon by means of which the autoclave may be sealed to withstand substantial internal pressure.

In the bottom portion of the autoclave chamber 27 is located a manifold 33 to which steam is supplied by means of the pipe 34. Water and compressed air are supplied to the autoclave 27 by means of a pipe 36 having a valve 37 therein. The autoclave chamber 27 also has a blow-off outlet 38 and a valved drainage outlet 39 for condensate therein. In the center of the reel is a compartment 40 in which the cans 19 are received so that the cans 19 may be rotated about their longitudinal axes during sterilization. Preferably the cans are rotated at about 100 to 200 revolutions per minute. This high speed rotation of the cans 19 agitates the milk violently and causes a rapid replacement of the milk in contact with the can walls, thereby heating the milk to a high temperature but preventing it from being maintained at this high temperature for a sufficient length of time to acquire the "cooked" flavor.

The use of steam under pressure in the sterilizer 26 permits the temperature of the milk in the cans to be raised very rapidly to the desired sterilizing temperature. The temperature of the cans can be reduced very abruptly by shutting off the steam and supplying cold water and compressed air to the sterilizer 26 through the pipe 36. Maintenance of pressure in the sterilizer 26 during cooling is desirable to prevent distortion of the cans. It will be understood that the sterilizer described above may be modified considerably and that other types of sterilizers, for example, baths of high boiling temperature salt solutions or organic liquids may be used, in order to quickly raise the milk to sterilizing temperature.

Summarizing the operation of the apparatus described above and the preferred process as practiced with this apparatus: The milk in tank 1 is raised to a forewarming temperature between 150° and 180° F., at which temperature it is maintained for a period of between 5 and 15 minutes during passage through the forewarmer 13 and the holding tank 4. The forewarming time and temperature will vary depending upon the characteristics of the milk. The forewarmed milk then passes to the vacuum pan where vacuum evaporation of the milk is conducted at about 130° F., until the total solids content of the milk reaches about 26%. The milk is then homogenized to render it uniform, cooled in the cooler 12 and delivered to the holding tank 13 where it is maintained under an atmosphere of inert gas. Thus, during the evaporation, homogenization, cooling and storage, the milk is maintained out of contact with and free from oxygen.

The milk is then delivered to the can filling machine 18 where it is filled into cans which previously have been de-aerated and filled with inert gas. Metallic calcium may be placed in the can in order to react with and remove the residual oxygen from the milk. The cans are then sealed, tested for leakage and sterilized. If desired, the milk may be heated to a temperature between 160° F. and 190° F. before sterilization for a period of 1 to 15 minutes to improve and control the stability of the product. The cans containing milk either at a temperature of about 60° F. or at a temperature of 160° to 190° F. are then delivered to the sterilizer 26.

The evaporated milk is heated in the sterilizer 26 with steam at about 280° F. to 300° F. from its initial temperature to a temperature of between 260° and 275° F. measured at the center of a standard 14½ ounce can in a period not exceeding 2 minutes, if the initial temperature of the milk was about 60° F., or in about 1½ minutes if the temperature of the milk in the cans was between 160 to 190° F. Upon attaining this sterilizing temperature, the milk is abruptly cooled by directing cold water or other liquid into the sterilizer 26. The extremely short period of heating, even at high temperatures sufficient to kill all micro-organisms, prevents "caramelizing" or "cooking" the milk.

It has been found desirable to store the milk at a temperature between 50° F. and 33° F. in order to minimize the formation of undesirable flavors therein if the canned and sterilized milk is to be stored for relatively long periods of time. If the milk is to be used within a short period of time, approximately one month, it is unnecessary to store it at low temperature, inasmuch as it has been found that desirable flavors do not develop in this short period of time.

The above described operation produces a milk product which has novel characteristics, namely, a fresh milk flavor, a white or creamy color, a high viscosity and other characteristics similar to fresh milk, such as the ability to be coagulated with rennet and whipped like cream, if subjected to a heating and chilling operation before whipping. Moreover, it has been found that the interiors of the cans do not have the undesirable dark coloration after the above treatment.

From the foregoing description of a typical process embodying the invention and the resulting products, it will be apparent that milk products made in accordance with the process have novel and highly desirable characteristics.

It will be understood, of course, that the process described above may be varied widely, such as for example, by combining one or more of the steps of the process and that widely varying apparatus may be used for practicing the process without departing from the invention. Accordingly, it should be understood that the above described process should be considered as illustrative only and not as limiting the scope of the following claims:

We claim:

1. A process for sterilizing evaporated milk in containers which comprises rotating a container containing evaporated milk about its longitudinal axis with said axis in a horizontal position while subjecting the container to a heated fluid at a temperature sufficient to raise the temperature of the milk to between about 260° and 275° F. in a period not exceeding about 2 minutes and when said milk reaches a temperature between about 260° and 275° F. immediately cooling the milk by bringing the container into contact with cold liquid.

2. A process for sterilizing evaporated milk which comprises filling evaporated milk into a container, preheating the milk in the container to a temperature between about 160° and 190° F., thereafter rotating said container about its longitudinal axis with said axis in a horizontal position while subjecting the container to a heated fluid at a temperature sufficient to raise the temperature of the milk from between 160° and 190° F. to between 260° and 275° F. in a period not exceeding about 1½ minutes and when said milk attains a temperature between about 260° and 275° F., immediately cooling the milk by bringing the container into contact with cold liquid.

RANDALL WHITAKER.
ROBERT P. MYERS.
ROBERT E. HOMBERGER.

CERTIFICATE OF CORRECTION.

Patent No. 2,372,239. March 27, 1945.

RANDALL WHITAKER, ET AL.

It is hereby certified that error appears in the printed specification of the above numbered patent requiring correction as follows: Page 1, second column, line 25, for "har" read --has--; page 3, second column, line 13, after the word "between" insert --about--; line 66, for "desirable" read --undesirable--; and that the said Letters Patent should be read with this correction therein that the same may conform to the record of the case in the Patent Office.

Signed and sealed this 5th day of June, A. D. 1945.

Leslie Frazer (Seal) Acting Commissioner of Patents.

interiors of the cans do not have the undesirable dark coloration after the above treatment.

From the foregoing description of a typical process embodying the invention and the resulting products, it will be apparent that milk products made in accordance with the process have novel and highly desirable characteristics.

It will be understood, of course, that the process described above may be varied widely, such as for example, by combining one or more of the steps of the process and that widely varying apparatus may be used for practicing the process without departing from the invention. Accordingly, it should be understood that the above described process should be considered as illustrative only and not as limiting the scope of the following claims:

We claim:

1. A process for sterilizing evaporated milk in containers which comprises rotating a container containing evaporated milk about its longitudinal axis with said axis in a horizontal position while subjecting the container to a heated fluid at a temperature sufficient to raise the temperature of the milk to between about 260° and 275° F. in a period not exceeding about 2 minutes and when said milk reaches a temperature between about 260° and 275° F. immediately cooling the milk by bringing the container into contact with cold liquid.

2. A process for sterilizing evaporated milk which comprises filling evaporated milk into a container, preheating the milk in the container to a temperature between about 160° and 190° F., thereafter rotating said container about its longitudinal axis with said axis in a horizontal position while subjecting the container to a heated fluid at a temperature sufficient to raise the temperature of the milk from between 160° and 190° F. to between 260° and 275° F. in a period not exceeding about 1½ minutes and when said milk attains a temperature between about 260° and 275° F., immediately cooling the milk by bringing the container into contact with cold liquid.

RANDALL WHITAKER.
ROBERT P. MYERS.
ROBERT E. HOMBERGER.

CERTIFICATE OF CORRECTION.

Patent No. 2,372,239.    March 27, 1945.

RANDALL WHITAKER, ET AL.

It is hereby certified that error appears in the printed specification of the above numbered patent requiring correction as follows: Page 1, second column, line 25, for "har" read --has--; page 3, second column, line 13, after the word "between" insert --about--; line 66, for "desirable" read --undesirable--; and that the said Letters Patent should be read with this correction therein that the same may conform to the record of the case in the Patent Office.

Signed and sealed this 5th day of June, A. D. 1945.

Leslie Frazer (Seal)    Acting Commissioner of Patents.